(12) United States Patent
McCloy et al.

(10) Patent No.: US 10,233,999 B2
(45) Date of Patent: Mar. 19, 2019

(54) OFF-AXIS-LOADED ANTI-BACKLASH PLANETARY DRIVE FOR E-PHASER

(71) Applicant: BorgWarner Inc., Auburn Hills, MI (US)

(72) Inventors: Chad McCloy, Cortland, NY (US); Michael Close, Apalachin, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 281 days.

(21) Appl. No.: 15/139,581

(22) Filed: Apr. 27, 2016

(65) Prior Publication Data

US 2016/0327124 A1    Nov. 10, 2016

Related U.S. Application Data

(60) Provisional application No. 62/156,985, filed on May 5, 2015.

(51) Int. Cl.
| | |
|---|---|
| *F16H 1/28* | (2006.01) |
| *F01L 1/344* | (2006.01) |
| *F01L 9/04* | (2006.01) |
| *F01L 1/352* | (2006.01) |

(52) U.S. Cl.
CPC ............ *F16H 1/2863* (2013.01); *F01L 1/344* (2013.01); *F01L 1/352* (2013.01); *F01L 9/04* (2013.01); *F16H 1/2836* (2013.01); *F01L 2250/06* (2013.01); *F01L 2820/032* (2013.01)

(58) Field of Classification Search
CPC .............................. F16H 1/2863; F16H 1/2872
See application file for complete search history.

(56) References Cited

U.S. PATENT DOCUMENTS

| | | | |
|---|---|---|---|
| 3,143,899 A | * | 8/1964 | York ..................... F16H 1/2863 |
| | | | 475/347 |
| 5,409,431 A | | 4/1995 | Vranish |
| 5,540,630 A | | 7/1996 | Vranish |
| 6,543,399 B2 | | 4/2003 | Heer |
| 7,261,667 B2 | | 8/2007 | Berger |
| 7,297,086 B2 | | 11/2007 | Fox |
| 7,506,623 B2 | | 3/2009 | Schafer et al. |

(Continued)

FOREIGN PATENT DOCUMENTS

| | | |
|---|---|---|
| JP | 3-48045 | 3/1991 |
| JP | 8-170695 | 7/1996 |

(Continued)

*Primary Examiner* — Tisha D Lewis (57) ABSTRACT

An electric phaser dynamically adjusting the rotational relationship of a camshaft of an internal combustion engine with respect to an engine crankshaft includes an electric motor and a planetary drive. In some embodiments, the planetary drive includes a sun gear, planet gears, a sprocket ring gear driven by the engine crankshaft, a camshaft ring gear rotating with the camshaft, a carrier, a lever arm, and a load generator. The lever arm is rotatably attached to at least one planet gear and pivotably attached to the carrier at a pivot point on the carrier located off-axis from the sun axis. The load generator is coupled to the carrier and applies a torque load to the lever arm to reduce backlash in the split ring planetary drive. The difference between the number of camshaft ring gear teeth and sprocket ring gear teeth is a multiple of the number of planet gears.

16 Claims, 7 Drawing Sheets

(56) References Cited

U.S. PATENT DOCUMENTS

| | | |
|---|---|---|
| 7,959,537 B2 | 6/2011 | Sugiura et al. |
| 8,192,323 B2 | 6/2012 | Fox |
| 8,313,411 B2 | 11/2012 | Schafer et al. |
| 9,033,849 B2 * | 5/2015 | Klein ................... F16H 57/082 475/347 |
| 9,366,317 B2 * | 6/2016 | Croce ................... F16H 57/082 |
| 2004/0206322 A1 * | 10/2004 | Meintschel ............. F01L 1/022 123/90.17 |
| 2006/0236965 A1 | 10/2006 | Schafer et al. |
| 2007/0179011 A1 | 8/2007 | Choi et al. |
| 2014/0148301 A1 | 5/2014 | Westholt et al. |
| 2014/0184002 A1 | 7/2014 | Levin et al. |

FOREIGN PATENT DOCUMENTS

| | | |
|---|---|---|
| WO | 03056141 | 7/2003 |
| WO | 2010018821 | 2/2010 |
| WO | 2013083188 | 6/2013 |
| WO | 2014092963 | 6/2014 |

* cited by examiner

OFF-AXIS-LOADED ANTI-BACKLASH PLANETARY DRIVE FOR E-PHASER

CROSS REFERENCE TO RELATED APPLICATIONS

This application claims the benefit of U.S. patent application Ser. No. 62/156,985 filed on May 5, 2015, the disclosure of which is herein incorporated by reference in its entirety.

BACKGROUND OF THE INVENTION

Field of the Invention

The invention pertains to the field of electric phasers (e-phasers). More particularly, the invention pertains to an electric phaser with an anti-backlash planetary drive.

Description of Related Art

In a closed loop power transmission system, variable cam timing (VCT) is the system that measures the angular displacement, or phase angle, of a camshaft, relative to the crankshaft to which it is operatively connected and then alters the phase angle to adjust various engine characteristics in response to demands for either an increase or a reduction in power. Typically, there is a feedback loop in which the desired values of such engine characteristics are measured against their existing values, and changes are effected inside the engine in response to any variances. To accomplish this, modern automobiles usually have one or more Electronic Control Units (ECU), which constantly analyze data fed into them from various parts of the engine or from other parts of the automobile, such as, for example, exhaust gas sensors, pressure sensors, and temperature sensors. A control signal is then emitted in response to such data. For example, with regard to VCT systems, as changes occur in engine or external conditions, the angular displacement between the camshaft and the crankshaft is adjusted accordingly.

A VCT system includes a cam phasing control device, sometimes referred to as a phaser and may include, control valves, control valve actuators, and control circuitry. VCT is a process that refers to controlling and varying, when desirable, the angular relationship (the "phase") between the drive shaft and one or more camshafts, which control the engine's intake and exhaust valves. An electric phaser (e-phaser) is driven by an electric motor to control and vary the angular relationship between the drive shaft and one or more camshafts. In response to input signals, the electric phaser adjusts the camshaft to either advance or retard engine timing.

U.S. Patent Application Publication No. 2007/0179011, by Choi et al., entitled "Variable Gear Ratio Steering Apparatus for Automobiles" and published Aug. 2, 2007, discloses a variable gear ratio steering apparatus including an input shaft connected to a steering wheel, a sun gear coaxially formed with the input shaft while enclosing the input shaft, a first pair of planet gears externally meshing with the sun gear, a second pair of planet gears externally meshing with the sun gear, a first carrier coupled to the input shaft while connecting the first pair of planet gears, a second carrier adapted to rotate relative to the input shaft while connecting the second pair of planet gears, a ring gear internally meshing with the first and second pairs of planet gears, and an input shaft connected to the ring gear. The second carrier is inserted into the first carrier while being supported by a compression means so that the second carrier can rotate relative to the input shaft to reduce backlash.

WO 2014/092963, by Showalter, entitled "Split Ring Gear Planetary Cam Phaser" and published Jun. 19, 2014, discloses a cam phaser for dynamically adjusting a rotational relationship of a camshaft of an internal combustion engine with respect to an engine crankshaft. The cam phaser can include a planetary gear system having a split ring gear, including a sprocket ring gear to be driven by the engine crankshaft through an endless loop power transmission member and a camshaft ring gear connectable for rotation with the camshaft. A sun gear can be located concentric with the split ring gear, and a number of planet gears can be in meshing engagement between the sun gear and the split ring gear. The camshaft ring gear can have a different number of teeth, greater or lesser, than the sprocket ring gear by a value corresponding to a multiple of the number of planet gears to provide tooth alignment at an engagement position of each of the planet gears.

SUMMARY OF THE INVENTION

An electric phaser dynamically adjusting the rotational relationship of a camshaft of an internal combustion engine with respect to an engine crankshaft includes an electric motor and a planetary drive. In some embodiments, the planetary drive includes a sun gear, planet gears, a sprocket ring gear driven by the engine crankshaft, a camshaft ring gear rotating with the camshaft, a carrier, a lever arm, and a load generator. The lever arm is rotatably attached to at least one planet gear and pivotably attached to the carrier at a pivot point on the carrier located off-axis from the sun axis. The load generator is coupled to the carrier and applies a torque load to the lever arm to reduce backlash in the split ring planetary drive. The difference between the number of camshaft ring gear teeth and sprocket ring gear teeth is a multiple of the number of planet gears.

In some embodiments, the planetary drive is a split ring planetary drive including a sun gear, a plurality of planet gears, a sprocket ring gear, a camshaft ring gear, a carrier, a lever arm, and a load generator. The sun gear is driven to rotate around a sun axis by the electric motor and includes a plurality of sun gear teeth. The planet gears are arranged around the sun gear with each planet gear including a plurality of planet teeth maintaining the planet gear in meshing engagement with the sun gear. The sprocket ring gear is driven by the engine crankshaft and includes a plurality of sprocket ring gear teeth maintaining the sprocket ring gear in meshing engagement with the planet gears. The camshaft ring gear is rotatable with the camshaft and includes a plurality of camshaft ring gear teeth maintaining the camshaft ring gear in meshing engagement with the planet gears. The carrier is rotatable around the sun axis and rotatably receives at least one first planet gear of the plurality of planet gears. The lever arm is rotatably attached to at least one second planet gear of the plurality of planet gears and pivotably attached to the carrier at a pivot point on the carrier located off-axis from the sun axis. The load generator is coupled to the carrier and applies a torque load to the lever arm to reduce backlash in the split ring planetary drive. A difference between a number of the camshaft ring gear teeth and a number of the sprocket ring gear teeth is a multiple of a number of the planet gears to provide tooth alignment at an engagement position of each of the planet gears.

In some embodiments, the planetary drive is a fixed sun planetary drive including sun gear, a plurality of planet gears, a ring gear, a carrier, a lever arm, and a load generator. The sun gear is driven to rotate around a sun axis by the electric motor and includes a plurality of sun gear teeth. The planet gears are arranged around the sun gear with each planet gear including a plurality of planet teeth maintaining the planet gear in meshing engagement with the sun gear. The ring gear is driven by the engine crankshaft and includes a plurality of ring gear teeth maintaining the ring gear in meshing engagement with the planet gears. The carrier is rotatable around the sun axis, rotatably receives at least one first planet gear of the plurality of planet gears, and is coupled to rotate with the camshaft. The lever arm is rotatably attached to at least one second planet gear of the plurality of planet gears and is pivotably attached to the carrier at a pivot point on the carrier located off-axis from the sun axis. The load generator is coupled to the carrier and applies a torque load to the lever arm to reduce backlash in the fixed sun planetary drive.

In some embodiments, a method of reducing backlash in an electric phaser for dynamically adjusting a rotational relationship of a camshaft of an internal combustion engine with respect to an engine crankshaft includes applying a torque load, by way of a load generator coupled to the carrier, to a lever arm rotatably attached to at least one second planet gear of the plurality of planet gears and pivotably attached to the carrier at a pivot point on the carrier located off-axis from the sun axis to reduce backlash in the planetary drive.

DETAILED DESCRIPTION OF THE INVENTION

An electric phaser dynamically adjusts the rotational relationship of the camshaft of an internal combustion engine with respect to the engine crankshaft. The electric phaser includes a planetary drive system driven by an electric motor. The planetary drive system is preferably a split ring planetary drive system with a sprocket ring gear driven by the engine crankshaft and a camshaft ring gear concentric with the sun gear and connected to the camshaft. The planetary drive system also includes a centrally-located sun gear, a plurality of planet gears engaging the sun gear, and at least one carrier connected to at least two of the planet gears. At least two of the planet gears are loaded with respect to each other to reduce backlash in the planetary drive system. The electric motor is preferably a brushless DC motor.

Although backlash and noise-vibration-harshness (NVH) can be significantly reduced by using highly precise ground gears, this generally makes manufacture of the gears prohibitively expensive. Gear loading is used herein to reduce the backlash and NVH with less precise gears that are much more inexpensive to produce.

One of the main differences between a single ring planetary system and a split ring planetary system is the significance of the backlash between the rings and the planets in a split ring planetary system. True circumferential loading is capable of taking out all of the backlash in a single ring planetary drive except for the bearing clearance between the planet shaft to planet gear. In contrast, true circumferential loading is capable of taking out most of the backlash in a split ring planetary drive, but not all, because the tooth widths are not perfectly matched between the two ring gears.

With a single ring planetary system, an outward radial movement of the planet gear only takes out backlash at the planet-gear-to-ring-gear interface but increases backlash at the sun-gear-to-planet-gear interface. With a split ring planetary system, initial testing indicated that a radial load seems to take the backlash out between the rings and the planets, and the high ratio does not add enough of a moment to the planet gear to cause rattling at the planet-gear-to-sun-gear interface.

Recent testing has shown that reducing the backlash at the planet-gear-to-ring-gear interface is capable of improving the NVH to an acceptable level in a split ring gear planetary drive system.

There is a tooth count difference between the camshaft ring gear and the sprocket ring gear that is divisible by the number of planet gears to provide tooth alignment at an engagement position of each of the planetary gears. The camshaft ring gear moves at a slightly different speed than the sprocket ring gear due to the tooth difference when the sun gear rotates at a different speed than the camshaft. In a preferred embodiment, the planetary drive system has three planet gears and there is a three tooth count difference between the camshaft ring gear and the sprocket ring gear in order to maximize the phasing resolution between the ring gears.

For a split ring planetary drive where the sun gear has x teeth, the sprocket ring gear has y teeth, and the camshaft ring gear has z teeth, the sun gear advances by $(1+y/x)/(1-y/z)$ revolutions with respect to the sprocket ring gear to advance the camshaft ring gear by one revolution with respect to the sprocket ring gear.

In some embodiments, an electric motor is connected to the sun gear to drive the sun gear in relation to the planet gears. When the electric motor rotates the sun gear at the same speed as the sprocket ring gear, a constant phase position is maintained between the crankshaft and the camshaft. Under these conditions, the planetary gear assembly rotates as a unit with no relative movement between the sun gear and the planet gears or between the planet gears and the ring gears, which minimizes frictional losses. Adjusting the electric motor speed with respect to the sprocket ring gear/camshaft ring gear/camshaft adjusts the phase of the camshaft with respect to the crankshaft.

In some embodiments, the camshaft ring gear has more teeth than the sprocket ring gear. In such embodiments, when the electric motor rotates the sun gear at a speed faster than the speed of the camshaft, the phaser is moving in the advancing direction. When the electric motor rotates the sun gear at a speed slower than the speed of the camshaft, the phaser is moving in the retarding direction.

In other embodiments, the sprocket ring gear has more teeth than the camshaft ring gear. In such embodiments, when the electric motor rotates the sun gear at a speed faster than the speed of the camshaft, the phaser is moving in the retarding direction. When the electric motor rotates the sun gear at a speed slower than the speed of the camshaft, the phaser is moving in the advancing direction.

The sprocket ring gear, the camshaft ring gear, the planet gears, and the sun gear are arranged in a planetary gear drive connection preferably having a high numerical gear ratio to allow accurate phasing angle adjustment with a relatively low driving torque requirement for the electric motor. The sprocket ring gear is preferably driven by the engine crankshaft through a sprocket and an endless loop power transmission chain, and the camshaft ring gear is preferably connected to rotate with the camshaft.

The planet gears may be loaded in any of a number of different ways with respect to each other to reduce backlash in the planetary drive system. In some embodiments, the loading of at least one planet gear is in the circumferential direction with respect to at least one other planet gear. The gears are preferably loaded partially in the radial direction and partially in the circumferential direction relative to each other so that the gears have no backlash, since the planet teeth are loaded against one side of the tooth. Alternatively, the gear teeth may be loaded only in the circumferential direction or only in the radial direction to reduce or eliminate backlash.

The loading may be provided by any device capable of generating a force. In some embodiments, the load is mechanically generated, preferably by a spring force. In other embodiments, the load is hydraulically generated. In yet other embodiments, the load is electromagnetically generated. The loading provides a planetary drive with lower backlash than a conventional planetary drive. The load generator is preferably strong enough to provide a load greater than the forces of the system acting on the load generator over all operating conditions of the electric phaser.

In some embodiments, the load is capable of being turned off when not needed, since adding the load to the device lowers the efficiency of the planetary drive when there is relative motion between the gears compared to a device without the load and with backlash. This is especially advantageous at high speeds, where the presence of the load is more noticeable and the NVH reduction is less needed. In some embodiments, for example, an electromagnetic load is turned off during operation of the electric phaser under conditions where backlash and NVH due to backlash are minimal or not significant. In some embodiments, the load is turned off at and above a predetermined engine speed and turned back on below the predetermined engine speed. In some embodiments, the predetermined engine speed is about 3000 rpm.

Although the load preferably eliminates backlash in the planetary drive, the load may alternatively only damp the planetary drive to reduce NVH and allow the use of gears with higher tolerances.

In some embodiments, the loading is selected to reduce or eliminate the backlash between the planet gears and the ring gears. In other embodiments, the loading is selected to reduce or eliminate the backlash between the planet gears and the sun gear.

In a preferred embodiment, the pivot point of the planet gear loading is located off-center of the axis of rotation of the sun gear, so that there is a radial component as well as a circumferential component to the loading, as the load rotates the planet gear and pivot arm. In a preferred embodiment, the location of the pivot is selected such that the separation forces at the gear teeth react mostly against the pivot point, thereby minimizing the spring force required.

Figure 1:
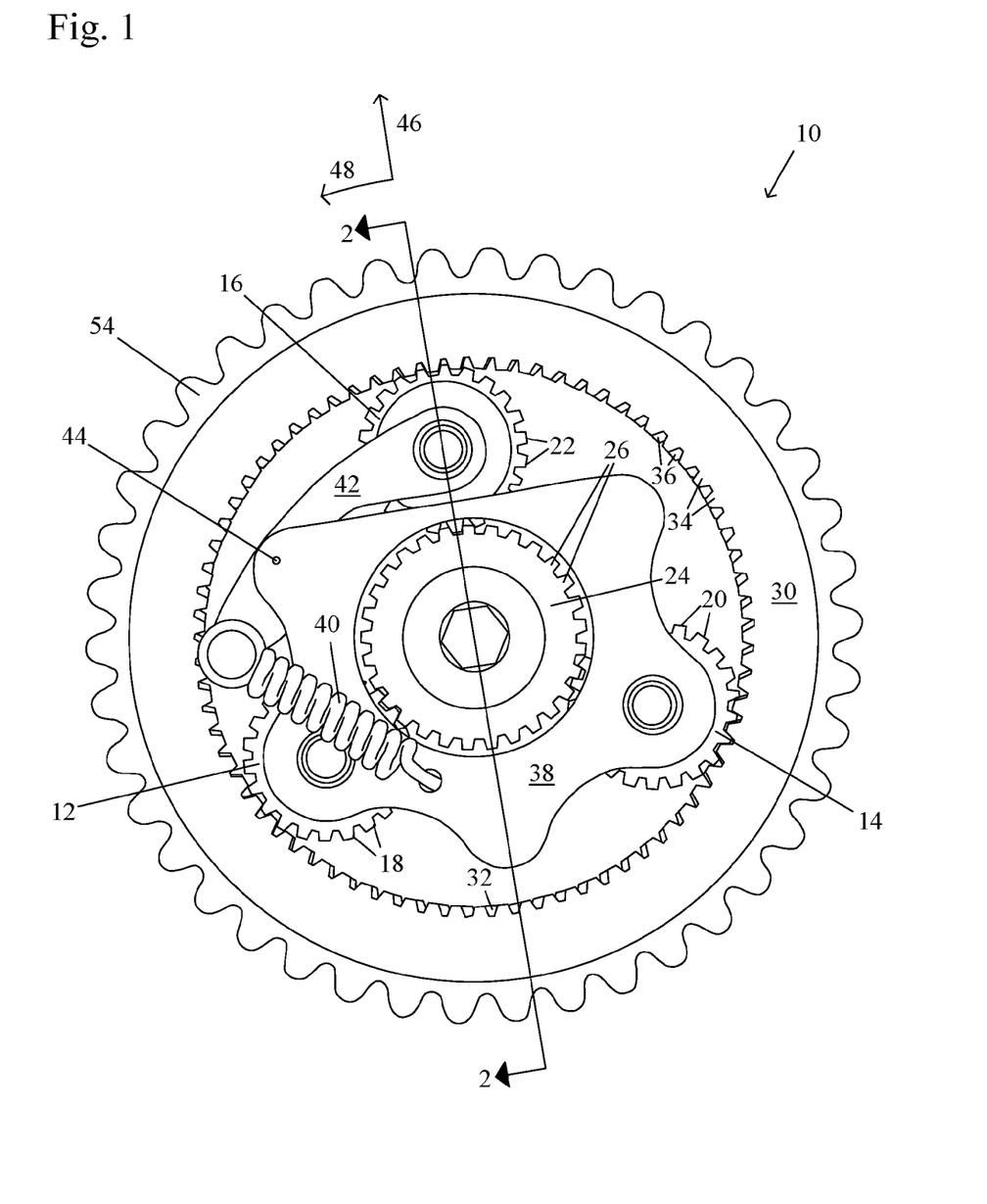
FIG. 1 shows a schematic front view of a planetary drive system in an embodiment of the present invention.

Referring to FIG. 1, a split ring gear planetary drive 10 includes planet gears 12, 14, 16 with planet gear teeth 18, 20, 22, a centrally located sun gear 24 with sun gear teeth 26, and a split ring gear including a sprocket ring gear 30 and a camshaft ring gear 32. The ring gears 30, 32 have different numbers of teeth 34, 36, where the difference in the number of teeth is a multiple of the number of planet gears 12, 14, 16. The ring gear teeth 34, 36 have profiles to allow the ring gears 30, 32 to mesh properly with the planet gears 12, 14, 16. Two of the planet gears 12, 14 are maintained in a fixed relationship to each other by a planetary carrier 38.

A spring 40 is attached at one end to the planetary carrier 38 and attached at the other end to a lever arm 42. The third planet gear 16 is mounted at the other end of the lever arm 42, which is pivotably mounted to the planetary carrier 38 at a pivot point 44 between the ends. The spring 40 provides a torque on the lever arm 42, which provides a load on the third planet gear 16 that is partially in a radial direction 46 and partially in a circumferential direction 48. For the arrangement shown in FIG. 1, the spring 40 is preferably a tension coil spring to bias the teeth 22 of the third planet gear 16 toward the teeth 34, 36 of the ring gears 30, 32 and eliminate backlash between the third planet gear 16 and the ring gears 30, 32. Since the other end of the spring 40 is coupled to the carrier 38, the spring 40 also pushes on the carrier 38 to apply a load partially in a circumferential direction 48 and partially in a radial direction 46 to bias the planet gears 12, 14 toward the teeth 34, 36 of the ring gears 30, 32 and eliminate backlash between the planet gears 12, 14 and the ring gears 30, 32. In an alternate embodiment of the arrangement shown in FIG. 1, the spring 40 is a compression coil spring to bias the teeth of the planet gears 12, 14, 16 toward the teeth of the sun gear 24 and eliminate backlash between the planet gears 12, 14, 16 and the sun gear 24.

Figure 2:
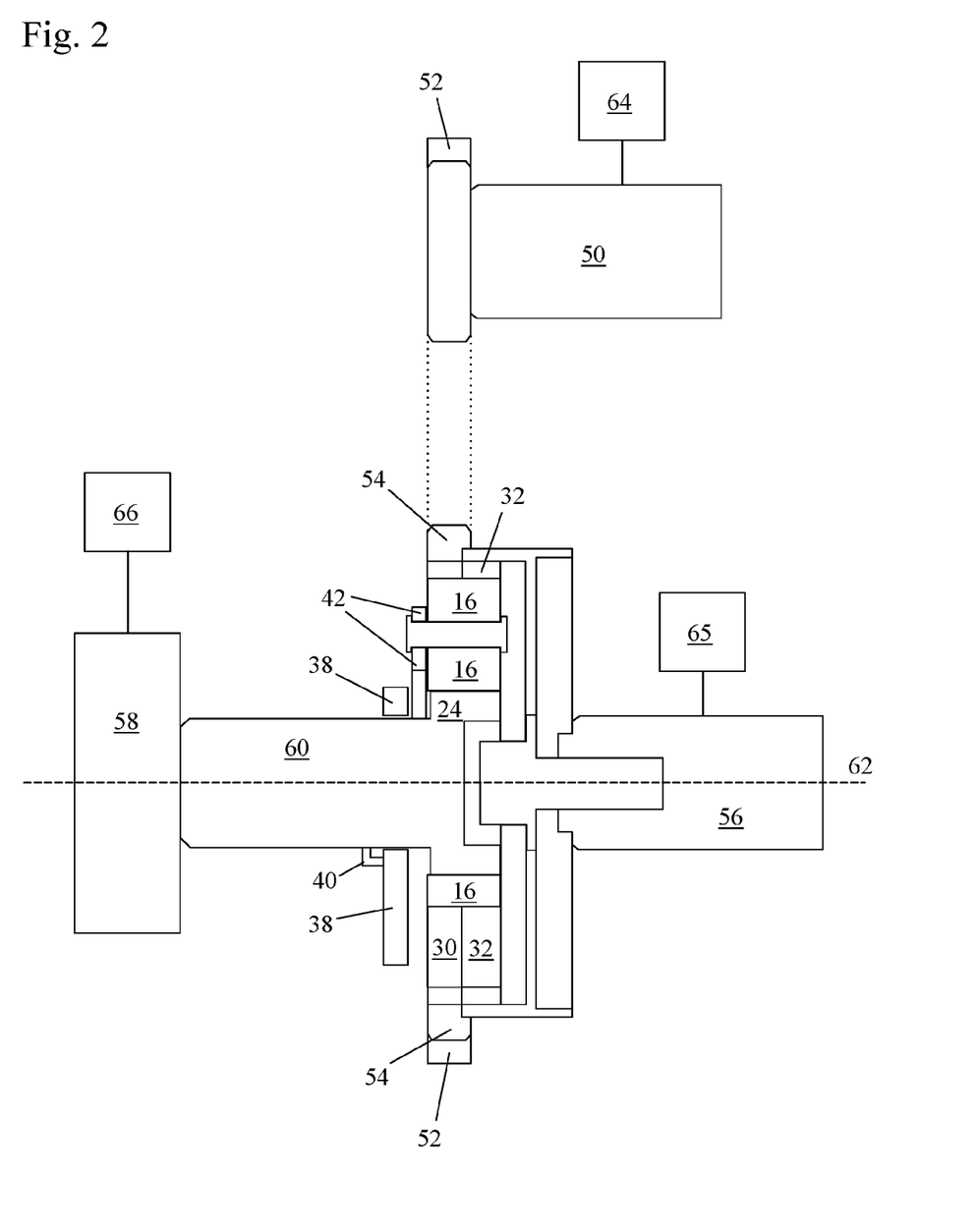
FIG. 2 shows a schematic view of an electric phaser including a schematic cross sectional view of the planetary drive system of FIG. 1 along line 2-2.

Referring to FIG. 2, an engine crankshaft 50 is rotationally engaged through a timing chain 52 to the sprocket ring gear 30 through a sprocket 54, and the engine camshaft 56 is rotationally engaged to the camshaft ring gear 32. An electric motor 58 is rotationally engaged with the sun gear 24 by way of an output shaft 60. When the sun gear 24 is rotated by the electric motor 58 around its axis 62 at the same speed as either of the ring gears 30, 32, a constant cam phase position is maintained, since both ring gears 30, 32 rotate in unison. When the sun gear 24 is driven at a different speed from the ring gears 30, 32 by the electric motor 58, a slightly different speed of one ring gear to the other ring gear causes a cam phase shift function. In this way, a very high numerical ratio is obtained and the camshaft 56 is phased either plus or minus from the nominal rotational relationship of the crankshaft 50 to the camshaft 56.

The cam phaser is preferably used to dynamically adjust the rotational relationship of the camshaft 56 to the engine crankshaft 50 to improve the fuel efficiency of the engine. Sensors 64, 65, with one sensor 64 on the crankshaft 50 and with one sensor 65 on the camshaft 56 are preferably used as feedback to a motor controller 66 to measure the current position of the camshaft 56 relative to the crankshaft 50 to determine what adjustment, if any, is desired at any point in time to achieve optimal engine efficiency.

Figure 3:
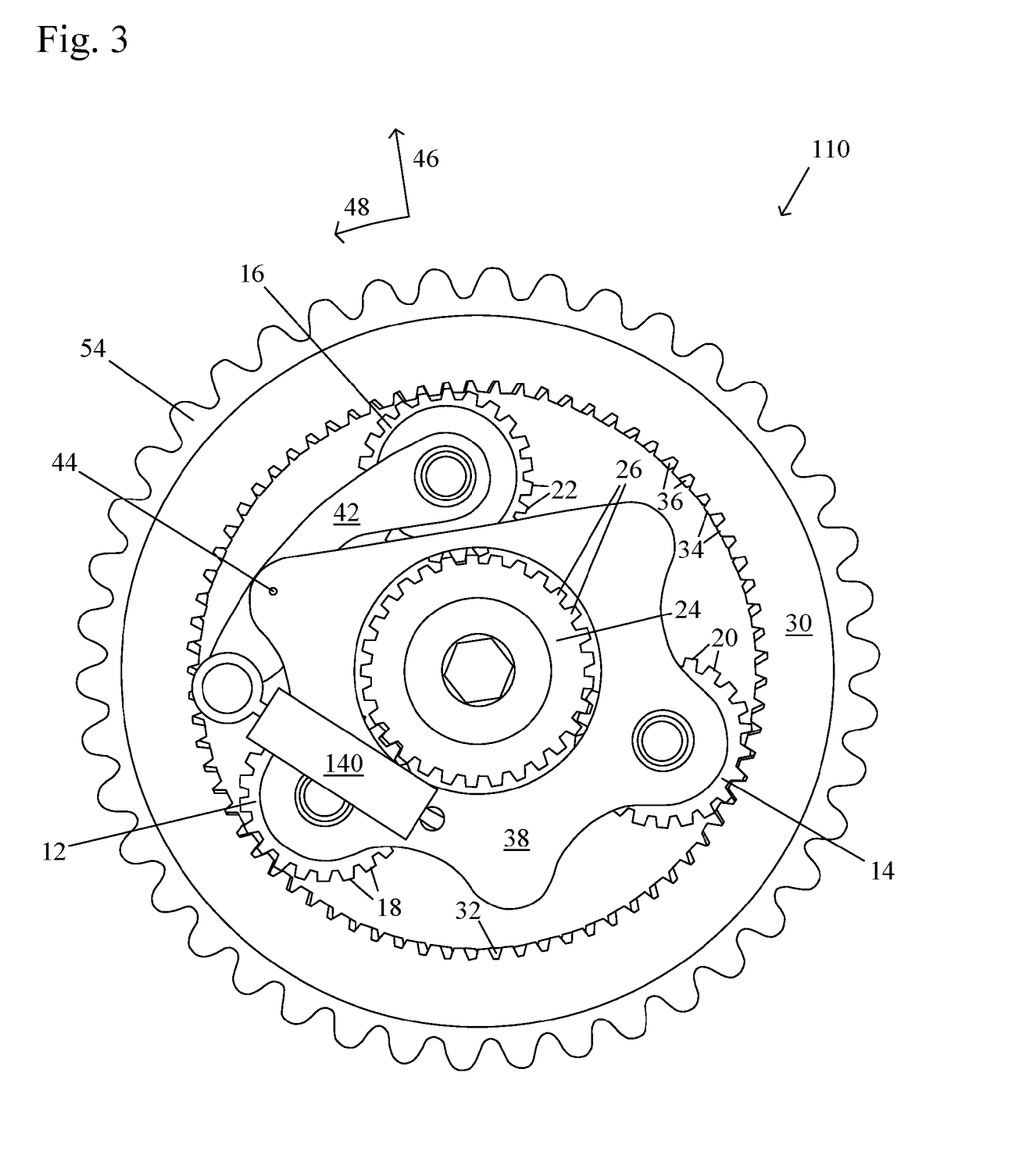
FIG. 3 shows a schematic front view of another planetary drive system in an embodiment of the present invention.

Referring to FIG. 3, a split ring gear planetary drive 110 includes planet gears 12, 14, 16 with planet gear teeth 18, 20, 22, a centrally located sun gear 24 with sun gear teeth 26, and a split ring gear including a sprocket ring gear 30 and a camshaft ring gear 32. A load generator 140 is attached at one end to the planetary carrier 38 and attached at the other end to a lever arm 42. The third planet gear 16 is mounted at the other end of the lever arm 42, which is pivotably mounted to the planetary carrier 38 at a pivot point 44 between the ends. The load generator 140 provides a torque on the lever arm 42, thereby providing a load on the third planet gear 16 that is partially in a radial direction 46 and partially in a circumferential direction 48. The load generator 140 may be any device capable of generating a load and may be based on a mechanically-generated force, an electromagnetically-generated force, or a hydraulically-generated force. For the arrangement shown in FIG. 3, the load generator 140 preferably pulls on the end of the lever arm 42 to bias the teeth of the planet gear 16 toward the teeth of the ring gears 30, 32 and eliminate backlash between the planet gears 12, 14, 16 and the ring gears 30, 32. In an alternate embodiment of the arrangement shown in FIG. 3, the load generator 140 pushes on the end of the lever arm 42 to bias the teeth of the planet gear 16 toward the teeth of the sun gear 24 and eliminate backlash between the planet gears 12, 14, 16 and the sun gear 24.

Figure 4:
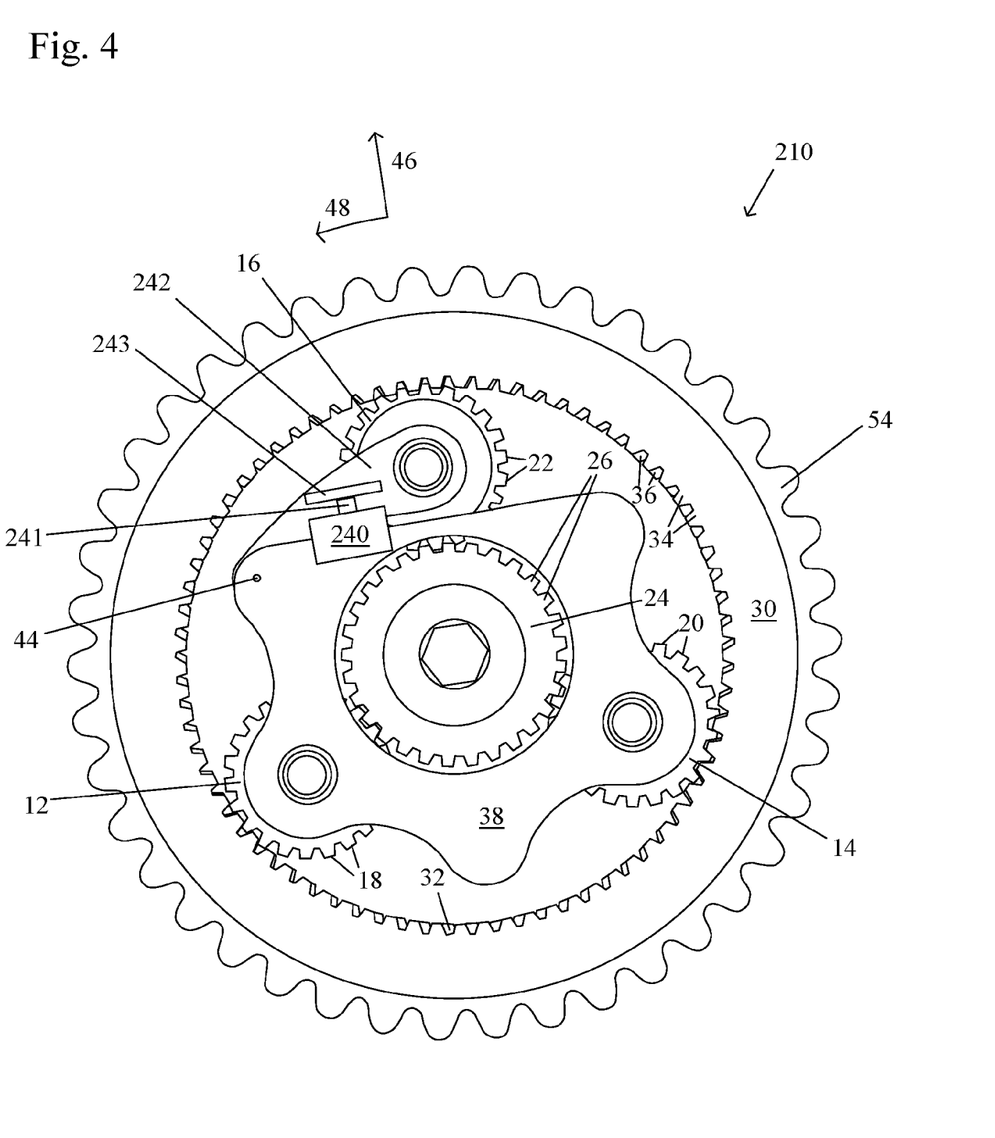
FIG. 4 shows a schematic front view of a planetary drive system with a chain tensioner-style anti-backlash mechanism in an embodiment of the present invention.

Referring to FIG. 4, a split ring gear planetary drive 210 includes planet gears 12, 14, 16 with planet gear teeth 18, 20, 22, a centrally located sun gear 24 with sun gear teeth 26, and a split ring gear including a sprocket ring gear 30 and a camshaft ring gear 32. A load generator 240 is attached to the planetary carrier 38 and applies a load to a central portion of a lever arm 242 between where the third planet gear 16 is mounted and where the planetary carrier 38 is mounted at a pivot point 44 to the lever arm 242. The load generator 240 includes a piston 241 that contacts an extension 243 on the lever arm 242 to provide a torque on the lever arm 242, thereby providing a load on the third planet gear 16 that is partially in a radial direction 46 and partially in a circumferential direction 48. The load generator 240 may be any device capable of generating a load and may be based on a mechanical force, an electromagnetic force, or a hydraulic force. In some embodiments, the load generator 240 is a hydraulic piston similar to the hydraulic pistons used for tensioning chains. In other embodiments, the load generator 240 is a compression coil spring. For the arrangement shown in FIG. 4, the load generator 240 preferably pushes on the lever arm 242 to bias the teeth 22 of the planet gear 16 toward the teeth 34, 36 of the ring gears 30, 32 and eliminate backlash between the planet gears 12, 14, 16 and the ring gears 30, 32. In an alternate embodiment of the arrangement shown in FIG. 4, the load generator 240 pulls on the lever arm 242 to bias the teeth 22 of the planet gear 16 toward the teeth 26 of the sun gear 24 and eliminate backlash between the planet gears 12, 14, 16 and the sun gear 24.

Figure 5:
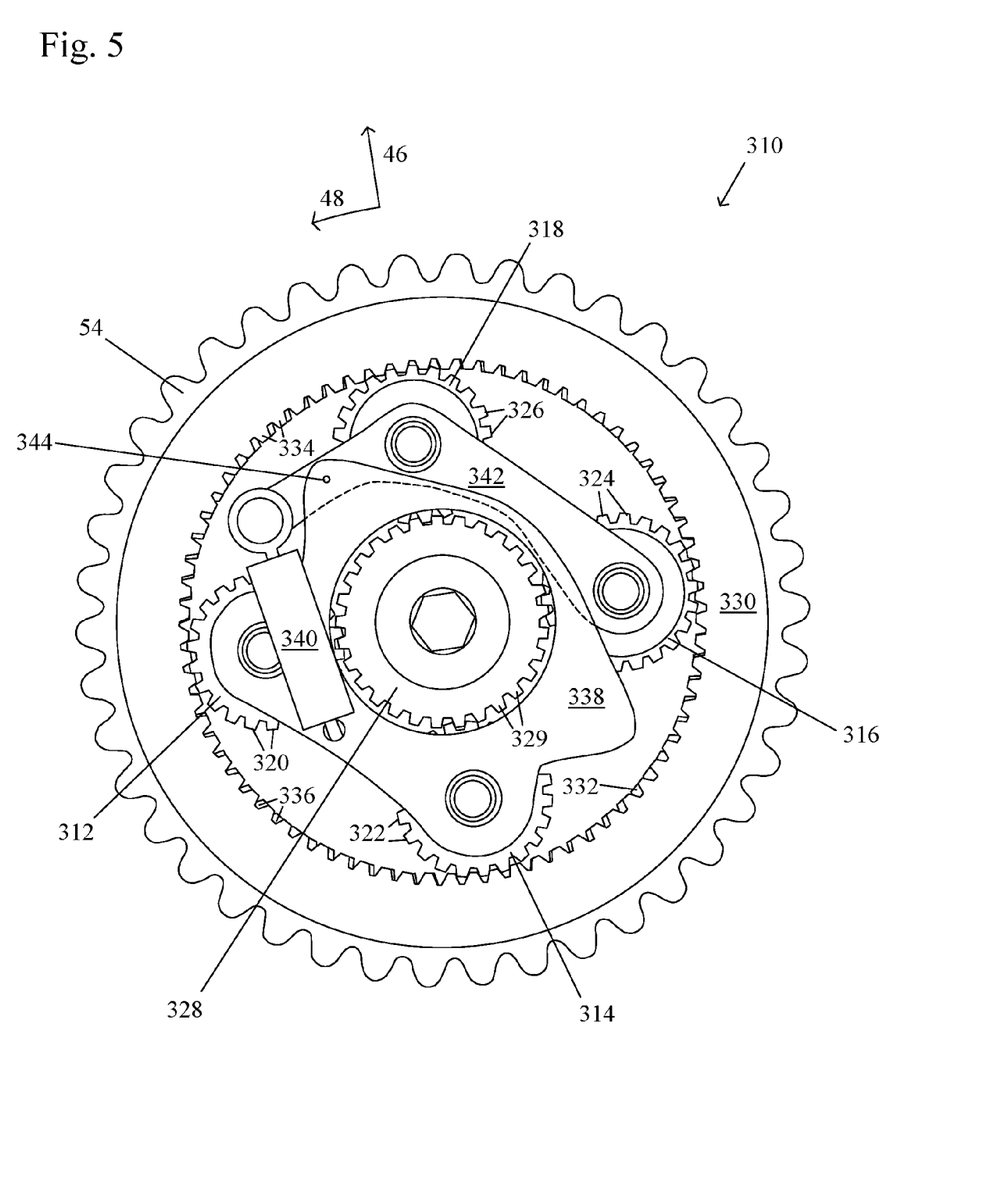
FIG. 5 shows a schematic front view of a planetary drive system with four planets in an embodiment of the present invention.

Although the split ring gear planetary drive preferably includes exactly three planets, the split gear planetary drive may alternatively include a different number of planets. FIG. 5 shows a split ring gear planetary drive 310 with four planet gears 312, 314, 316, 318 with planet gear teeth 320, 322, 324, 326, a centrally located sun gear 328 with sun gear teeth 329, and a split ring gear including a sprocket ring gear 330 and a camshaft ring gear 332. The ring gears 330, 332 have different numbers of teeth 334, 336, where the difference in the number of teeth 334, 336 is a multiple of the number of planet gears 312, 314, 316, 318. The ring gear teeth 334, 336 have profiles to allow the ring gears 330, 332 to mesh properly with the planet gears 312, 314, 316, 318. Two of the planet gears 312, 314 are maintained in a fixed relationship to each other by a planetary carrier 338. The other two planetary gears 316, 318 are maintained in a fixed relationship to each other by a lever arm 342.

A load generator 340 is attached at one end to the planetary carrier 338 and attached at the other end to an end of the lever arm 342. The third planet gear 316 and fourth planet gear 318 are mounted to the lever arm 342, which is pivotably mounted to the planetary carrier 338 at a pivot point 344 between the end and the mountings to the planet gears 316, 318. The load generator 340 provides a torque on the lever arm 342, which provides a load on the planet gears 316, 318 that is partially in a radial direction 46 and partially in a circumferential direction 48. The load generator 340 may be any device capable of generating a load and may be based on a mechanically-generated force, an electromagnetically-generated force, or a hydraulically-generated force. For the arrangement shown in FIG. 5, the load generator 340 preferably pulls on the end of the lever arm 342 to bias the teeth 324, 326 of the planet gears 316, 318 toward the teeth 334, 336 of the ring gears 330, 332 and eliminate backlash between the planet gears 316, 318 and the ring gears 330, 332. Since the other end of the load generator 340 is coupled to the carrier 338, the load generator 340 also pushes on the carrier 338 to apply a load partially in a circumferential direction 48 and partially in a radial direction 46 to bias the planet gears 312, 314 toward the teeth 334, 336 of the ring gears 330, 332 and eliminate backlash between the planet gear 312, 314 and the ring gears 330, 332. In an alternate embodiment of the arrangement shown in FIG. 5, the load generator 340 pushes on the end of the lever arm 342 to bias the teeth 324, 326 of the planet gears 316, 318 toward the teeth 329 of the sun gear 328 and eliminate backlash between the planet gears 316, 318 and the sun gear 328.

In other embodiments, the split ring gear planetary drive has six planet gears with three on a carrier and the other three on a lever arm biased by a load generator.

Although the planetary drive has been described above as a split ring gear planetary drive, any of the above-described backlash reduction designs may alternatively be applied to a fixed sun planetary drive. In such embodiments, the sun remains fixed to maintain the current phasing. Driving the sun gear with the electric motor adjusts the phase of the camshaft with respect to the crankshaft. To move the phaser in the retarding direction, the electric motor causes the sun gear to turn in the opposite direction as the camshaft. To move the phaser in the advancing direction, the electric motor causes the sun gear to turn in the same direction as the camshaft. The electric motor is preferably a brushed DC motor.

Figure 6:
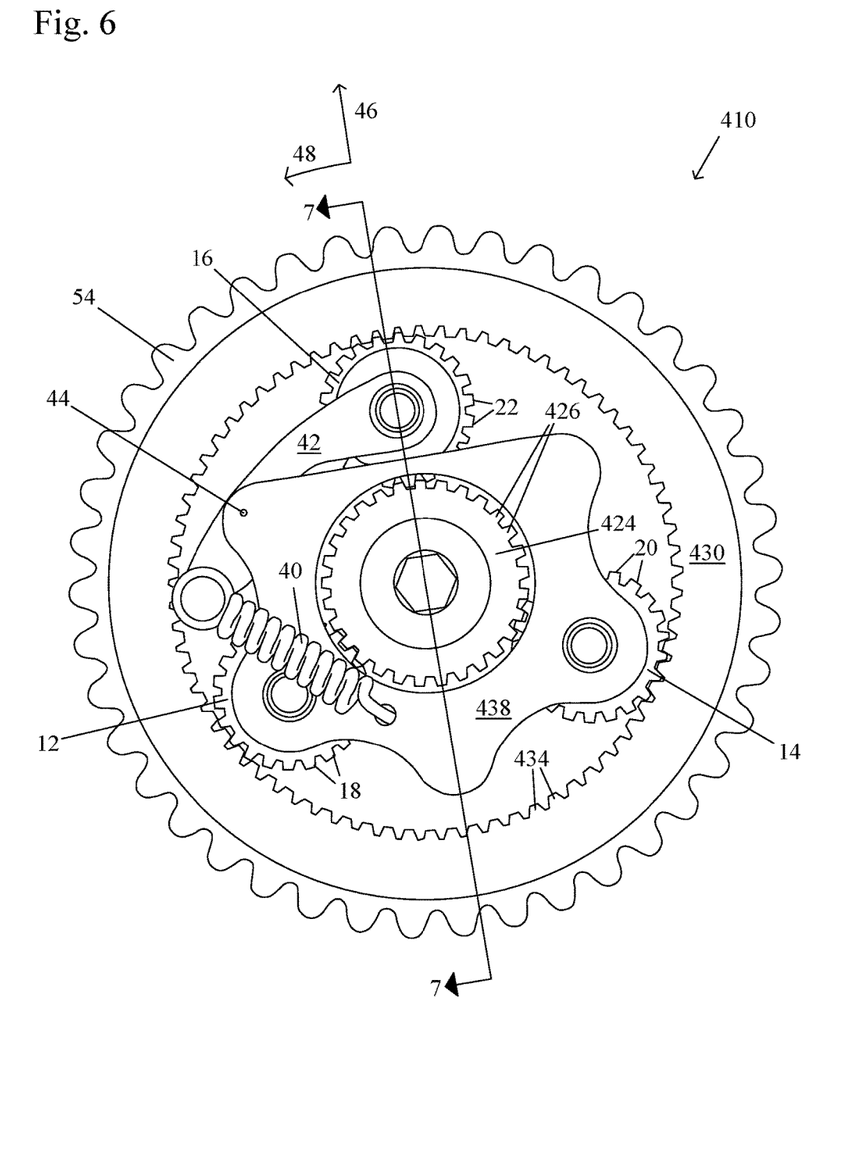
FIG. 6 shows a schematic front view of a planetary drive system in a fixed sun embodiment of the present invention.

Referring to FIG. 6, a fixed sun planetary drive 410 includes planet gears 12, 14, 16 with planet gear teeth 18, 20, 22, a centrally located sun gear 424 with sun gear teeth 426, and a ring gear 430 with ring gear teeth 434. The ring gear teeth 434 have profiles to allow the ring gear 430 to mesh properly with the planet gears 12, 14, 16. Two of the planet gears 12, 14 are maintained in a fixed relationship to each other by a planetary carrier 438.

A spring 40 is attached at one end to the planetary carrier 438 and attached at the other end to a lever arm 42. The third planet gear 16 is mounted at the other end of the lever arm 42, which is pivotably mounted to the planetary carrier 438 at a pivot point 44 between the ends. The spring 40 provides a torque on the lever arm 42, which provides a load on the third planet gear 16 that is partially in a radial direction 46 and partially in a circumferential direction 48. For the arrangement shown in FIG. 6, the spring 40 is preferably a tension coil spring to bias the teeth of the third planet gear 16 toward the teeth of the ring gear 430 and eliminate backlash between the third planet gear 16 and the ring gear 430. Since the other end of the spring 40 is coupled to the carrier 438, the spring 40 also pushes on the carrier 438 to apply a load partially in a circumferential direction 48 and partially in a radial direction 46 to bias the planet gears 12, 14 toward the teeth 434 of the ring gear 430 and eliminate backlash between the planet gears 12, 14 and the ring gear 430. In an alternate embodiment of the arrangement shown in FIG. 6, the spring 40 is a compression coil spring to bias the teeth 18, 20 of the planet gears 12, 14, 16 toward the teeth 426 of the sun gear 424 and eliminate backlash between the planet gears 12, 14, 16 and the sun gear 424.

Figure 7:
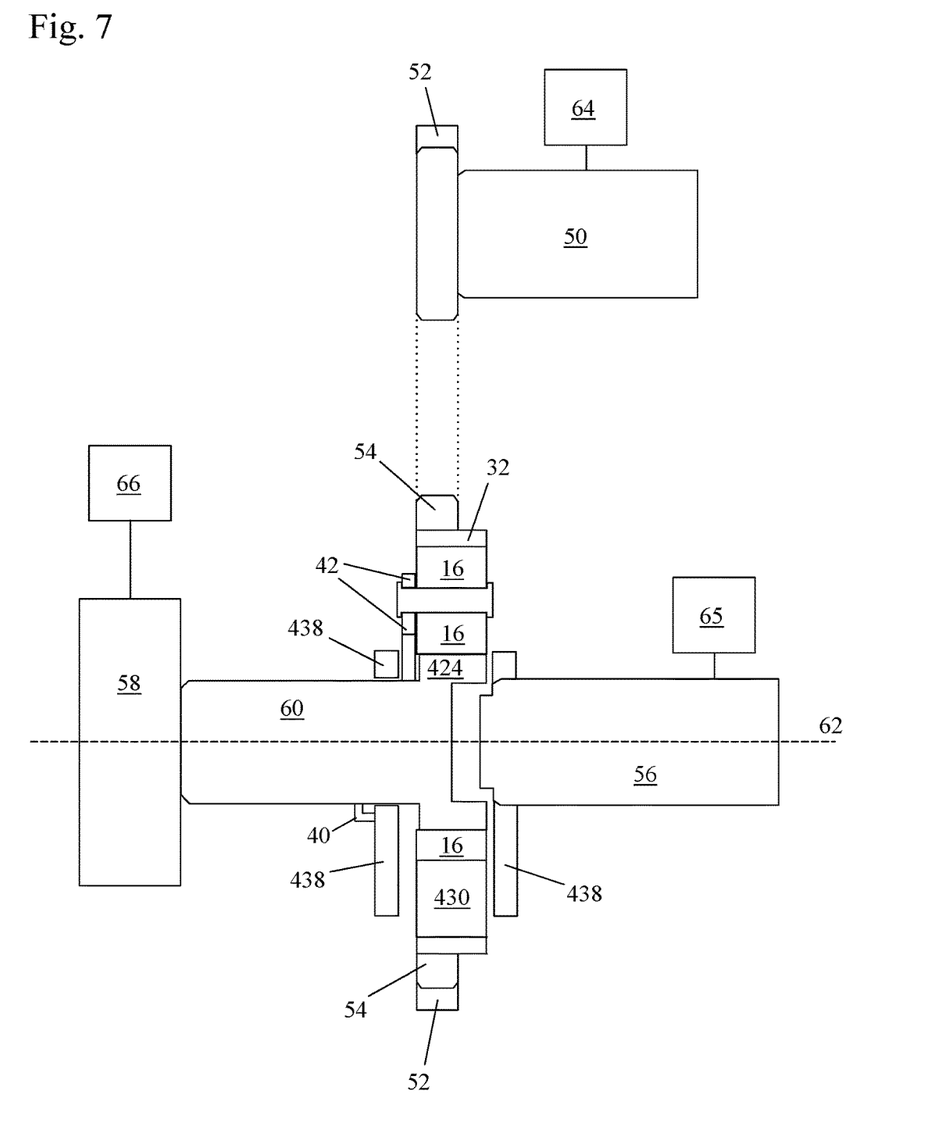
FIG. 7 shows a schematic view of an electric phaser including a schematic cross sectional view of the planetary drive system of FIG. 6 along line 7-7.

Referring to FIG. 7, an engine crankshaft 50 is rotationally engaged through a timing chain 52 to the ring gear 430 through a sprocket 54, and the engine camshaft 56 is rotationally engaged to the carrier 438. An electric motor 58 is rotationally engaged with the sun gear 424 by way of an output shaft 60. When the sun gear 424 is held stationary, a constant cam phase position is maintained. When the sun gear 424 is driven by the electric motor 58, the planetary drive causes a cam phase shift function.

The cam phaser is preferably used to dynamically adjust the rotational relationship of the camshaft 56 to the engine crankshaft 50 to improve the fuel efficiency of the engine. Sensors 64, 65, one 64 on the crankshaft 50 and one 65 on the camshaft 56 are preferably used as feedback to a motor controller 66 to measure the current position of the camshaft 56 relative to the crankshaft 50 to determine what adjustment, if any, is desired at any point in time to achieve optimal engine efficiency.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An electric phaser for dynamically adjusting a rotational relationship of a camshaft of an internal combustion engine with respect to an engine crankshaft, the electric phaser comprising:
    an electric motor; and
        a planetary drive comprising:
            a sun gear driven to rotate around a sun axis by the electric motor, the sun gear comprising a plurality of sun gear teeth;
            a plurality of planet gears arranged around the sun gear, each planet gear comprising a plurality of planet teeth maintaining the planet gear in meshing engagement with the sun gear;
            at least one ring gear comprising a plurality of ring gear teeth maintaining the ring gear in meshing engagement with the planet gears;
            a carrier rotatable around the sun axis and rotatably receiving at least one first planet gear of the plurality of planet gears;
            a lever arm rotatably attached to at least one second planet gear of the plurality of planet gears and pivotably attached to the carrier at a pivot point on the carrier located off-axis from the sun axis; and
            a load generator coupled to the carrier and applying a torque load to the lever arm to bias the at least one second planet gear away from the sun axis and toward the at least one ring gear to reduce backlash in the planetary drive.

2. The electric phaser of claim 1, wherein the planetary drive is a split ring planetary drive and the at least one ring gear comprises:
    a sprocket ring gear driven by the engine crankshaft, the sprocket ring gear comprising a plurality of sprocket ring gear teeth maintaining the sprocket ring gear in meshing engagement with the planet gears; and
    a camshaft ring gear rotatable with the camshaft, the camshaft ring gear comprising a plurality of camshaft ring gear teeth maintaining the camshaft ring gear in meshing engagement with the planet gears;
    wherein a difference between a number of the camshaft ring gear teeth and a number of the sprocket ring gear teeth is a multiple of a number of the planet gears to provide tooth alignment at an engagement position of each of the planet gears.

3. The electric phaser of claim 1, wherein the plurality of planet gears comprises three planet gears.

4. The electric phaser of claim 1, wherein the plurality of planet gears comprises four planet gears.

5. The electric phaser of claim 1, wherein the load generator is a coil spring.

6. The electric phaser of claim 1, wherein the load generator provides a hydraulically-generated force as the torque load to the lever arm.

7. The electric phaser of claim 1, wherein the load generator provides an electromagnetically-generated force as the torque load to the lever arm.

8. The electric phaser of claim 1, wherein the load generator applies the torque load to a first end of the lever arm, wherein the pivot point is located between the first end of the lever arm and where the lever arm is rotatably attached to the at least one second planet gear.

9. The electric phaser of claim 1, wherein the load generator applies the torque load to the lever arm at a location between where the pivot point is located and where the lever arm is rotatably attached to the at least one second planet gear.

10. The electric phaser of claim 1, wherein the planetary drive is a fixed sun planetary drive, the ring gear is driven by the engine crankshaft, and the carrier is coupled to rotate with the camshaft.

11. A method of reducing backlash in an electric phaser for dynamically adjusting a rotational relationship of a camshaft of an internal combustion engine with respect to an engine crankshaft, the electric phaser comprising an electric motor and a planetary drive comprising a sun gear driven to rotate around a sun axis by the electric motor, the sun gear comprising a plurality of sun gear teeth, a plurality of planet gears arranged around the sun gear, each planet gear comprising a plurality of planet teeth maintaining the planet gear in meshing engagement with the sun gear, at least one ring gear comprising a plurality of ring gear teeth maintaining the ring gear in meshing engagement with the planet gears, and a carrier rotatable around the sun axis and rotatably receiving at least one first planet gear of the plurality of planet gears, the method comprising:
    a) applying a torque load, by way of a load generator coupled to the carrier, to a lever arm rotatably attached to at least one second planet gear of the plurality of planet gears and pivotably attached to the carrier at a pivot point on the carrier located off-axis from the sun axis to bias the at least one second planet gear away from the sun axis and toward the at least one ring gear to reduce backlash in the planetary drive.

12. The method of claim 11, further comprising the steps of:
    b) rotatably attaching a pivot arm to at least one second planet gear of the plurality of planet gears and pivotably attaching the lever arm to the carrier at the pivot point on the carrier; and c) coupling the load generator to the carrier to apply the torque load to the lever arm.

13. The method of claim 11, further comprising the step of turning off the torque load when the internal combustion engine reaches a predetermined engine speed.

14. The method of claim 11, wherein the torque load is applied to a first end of the lever arm, wherein the pivot point is located between the first end of the lever arm and where the lever arm is rotatably attached to the at least one second planet gear.

15. The method of claim 11, wherein the torque load is applied to the lever arm at a location between where the pivot point is located and where the lever arm is rotatably attached to the at least one second planet gear.

16. An electric phaser for dynamically adjusting a rotational relationship of a camshaft of an internal combustion engine with respect to an engine crankshaft, the electric phaser comprising:
an electric motor; and
a planetary drive comprising:
a sun gear driven to rotate around a sun axis by the electric motor, the sun gear comprising a plurality of sun gear teeth;
a plurality of planet gears arranged around the sun gear, each planet gear comprising a plurality of planet teeth maintaining the planet gear in meshing engagement with the sun gear;
at least one ring gear comprising a plurality of ring gear teeth maintaining the ring gear in meshing engagement with the planet gears;
a carrier rotatable around the sun axis and rotatably receiving at least one first planet gear of the plurality of planet gears;
a lever arm rotatably attached to at least one second planet gear of the plurality of planet gears and pivotably attached to the carrier at a pivot point on the carrier located off-axis from the sun axis; and
a load generator coupled to the carrier and applying a torque load to the lever arm to reduce backlash in the planetary drive, wherein the load generator applies the torque load to a first end of the lever arm, wherein the pivot point is located between the first end of the lever arm and where the lever arm is rotatably attached to the at least one second planet gear.

* * * * *